United States Patent
Hyde, II et al.

(10) Patent No.: US 9,632,707 B2
(45) Date of Patent: Apr. 25, 2017

(54) ENHANCING TIERING STORAGE PERFORMANCE

(71) Applicant: INTERNATIONAL BUSINESS MACHINES CORPORATION, Armonk, NY (US)

(72) Inventors: Joseph S. Hyde, II, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/669,623

(22) Filed: Mar. 26, 2015

(65) Prior Publication Data

US 2015/0205528 A1    Jul. 23, 2015

Related U.S. Application Data

(63) Continuation of application No. 13/801,461, filed on Mar. 13, 2013, now Pat. No. 8,996,808, which is a
(Continued)

(51) Int. Cl.
*G06F 12/00* (2006.01)
*G06F 3/06* (2006.01)

(52) U.S. Cl.
CPC ............ *G06F 3/061* (2013.01); *G06F 3/0608* (2013.01); *G06F 3/0611* (2013.01);
(Continued)

(58) Field of Classification Search
CPC .... G06F 3/0611; G06F 3/0641; G06F 3/0608; G06F 3/0665; G06F 3/061; G06F 3/0649; G06F 3/0685; G06F 3/0689
See application file for complete search history.

(56) References Cited

U.S. PATENT DOCUMENTS

| 5,276,867 A | 1/1994 | Kenley et al. |
| 6,353,438 B1 | 3/2002 | Van Hook et al. |

(Continued)

FOREIGN PATENT DOCUMENTS

| CN | 1149486 C | 5/2004 |
| CN | 101989236 A | 3/2011 |
| WO | 2010040078 A3 | 4/2010 |

OTHER PUBLICATIONS

Massiglia, Paul, Exploiting Multi-tier File Store Effectively, 32, Storage Networking Industry Association.

*Primary Examiner* — David X Yi
*Assistant Examiner* — Tahilba Puche
(74) *Attorney, Agent, or Firm* — Griffiths & Seaton PLLC (IBM)

(57) ABSTRACT

A method for improving data storage and retrieval performance, comprising, for a tiered storage environment having levels corresponding to storage performance, using reference count information of at least one data segment maintained in the storage environment to determine which of the levels in the environment the data segment will be assigned; obtaining input/output performance data for input/output operations on the data segment and transforming the data into short term moving averages and long term moving averages; comparing the averages in a performance level to the long term moving averages of the data segment in the performance level and examining the reference count information over time to determine whether a performance trend of the data segment is increasing or decreasing; and promoting the data segment to a higher performance level in the tiered storage environment, if the data segment has an increasing performance trend.

8 Claims, 4 Drawing Sheets

Related U.S. Application Data continuation of application No. 13/465,435, filed on May 7, 2012, now Pat. No. 9,021,203.

(52) U.S. Cl.
CPC .......... *G06F 3/0641* (2013.01); *G06F 3/0649* (2013.01); *G06F 3/0665* (2013.01); *G06F 3/0685* (2013.01); *G06F 3/0689* (2013.01)

(56) References Cited

U.S. PATENT DOCUMENTS

| | | |
|---|---|---|
| 6,654,855 B1 | 11/2003 | Bopardikar et al. |
| 7,496,711 B2 | 2/2009 | Bartley et al. |
| 7,567,188 B1 | 7/2009 | Anglin et al. |
| 7,822,939 B1 | 10/2010 | Veprinsky et al. |
| 8,204,862 B1 | 6/2012 | Paulzagade et al. |
| 8,280,854 B1* | 10/2012 | Emmert ............ G06F 17/30221 707/637 |
| 8,407,191 B1 | 3/2013 | Nanda |
| 8,433,689 B1 | 4/2013 | Paulzagade et al. |
| 8,495,304 B1 | 7/2013 | Natanzon et al. |
| 8,578,120 B2 | 11/2013 | Attarde et al. |
| 8,732,403 B1 | 5/2014 | Nayak |
| 2003/0163644 A1 | 8/2003 | Hoang et al. |
| 2007/0198779 A1 | 8/2007 | Wang |
| 2008/0243914 A1 | 10/2008 | Prahlad et al. |
| 2008/0288657 A1 | 11/2008 | Ushiyama |
| 2009/0132619 A1 | 5/2009 | Arakawa et al. |
| 2009/0204765 A1 | 8/2009 | Gupta et al. |
| 2010/0274826 A1* | 10/2010 | Takata .................. G06F 3/0605 707/812 |
| 2010/0306175 A1 | 12/2010 | Johnson et al. |
| 2010/0312752 A1 | 12/2010 | Zeis et al. |
| 2010/0333116 A1 | 12/2010 | Prahlad et al. |
| 2011/0010514 A1 | 1/2011 | Benhase et al. |
| 2011/0029497 A1 | 2/2011 | Benhase et al. |
| 2011/0107052 A1 | 5/2011 | Narayanasamy |
| 2011/0131390 A1 | 6/2011 | Srinivasan et al. |
| 2011/0161723 A1 | 6/2011 | Taleck et al. |
| 2011/0197046 A1* | 8/2011 | Chiu ..................... G06F 3/0617 711/171 |
| 2011/0246741 A1 | 10/2011 | Raymond et al. |
| 2011/0258374 A1 | 10/2011 | Pertocelli |
| 2012/0011318 A1 | 1/2012 | Hasegawa |
| 2012/0030477 A1 | 2/2012 | Lu et al. |
| 2012/0137061 A1 | 5/2012 | Yang et al. |
| 2012/0137081 A1 | 5/2012 | Shea |
| 2012/0150826 A1 | 6/2012 | Vijayan Retnamma et al. |
| 2013/0013850 A1 | 1/2013 | Baderdinni |
| 2013/0297569 A1 | 11/2013 | Hyde, II et al. |
| 2013/0297872 A1 | 11/2013 | Hyde, II et al. |
| 2013/0297873 A1 | 11/2013 | Hyde, II et al. |
| 2013/0297884 A1 | 11/2013 | Hyde, II et al. |
| 2013/0297885 A1 | 11/2013 | Hyde, II et al. |
| 2013/0297886 A1 | 11/2013 | Hyde, II et al. |
| 2015/0293848 A1 | 10/2015 | Hyde, II et al. |

* cited by examiner

ENHANCING TIERING STORAGE PERFORMANCE

CROSS REFERENCE TO RELATED APPLICATIONS

This application is a Continuation of U.S. patent application Ser. No. 13/801,461, filed on Mar. 13, 2013, which is a Continuation of U.S. patent application Ser. No. 13/465,435, filed on May 7, 2012, both of which are hereby incorporated by reference in their entirety.

FIELD OF THE INVENTION

The present invention relates in general to computers, and more particularly to a method, system, and computer program product for enhancing storage performance in multiple tier computing storage environments.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

A particular storage tiering system may be configured for detecting "hot spots" in order to migrate more frequently accessed data onto higher performance storage. This may be accomplished by monitoring disk accesses, for example. To detect access pattern trends by such monitoring takes time, however, and this migration may occur with a corresponding time lag.

Accordingly, a method for improving data storage and retrieval performance is provided, comprising, for a tiered storage environment having levels corresponding to storage performance, using reference count information of at least one data segment maintained in the storage environment to determine which of the levels in the environment the data segment will be assigned; obtaining input/output performance data for input/output operations on the data segment and transforming the data into short term moving averages and long term moving averages; comparing the averages in a performance level to the long term moving averages of the data segment in the performance level and examining the reference count information over time to determine whether a performance trend of the data segment is increasing or decreasing; and promoting the data segment to a higher performance level in the tiered storage environment, if the data segment has an increasing performance trend.

In addition to the foregoing exemplary embodiment, various embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
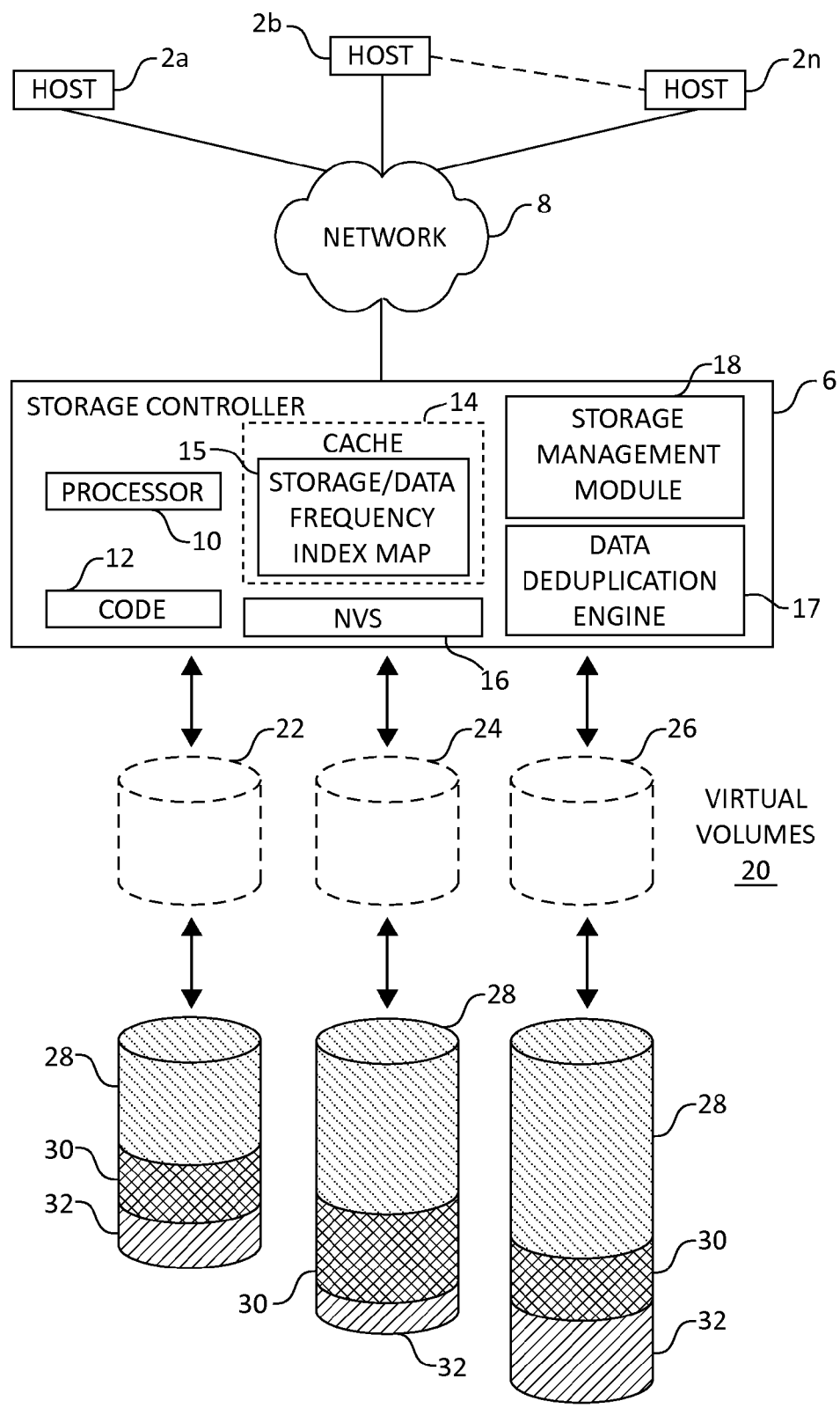
FIG. 1 is a block diagram illustrating an exemplary multi-tiered data storage computing environment which may implement aspects of the present invention.

As one of ordinary skill in the art will appreciate, a variety of differing storage units are typically used in a particular situation. For example, solid state drives (SSD) typically have a much lower latency than a hard disk drive (HDD), but may also have a corresponding lower capacity. Further, tape devices may have an even higher latency than HDD devices, but may have the greatest storage capacity (or lowest cost per unit of storage). The differences between storage units classified into these exemplary classes (i.e., SSD, HDD, SATA, tape, etc.) are significant.

It is not uncommon that as the size of a body of stored data grows, the utilization efficiency of the data volume decreases. In other words, at any given time, only a small portion of the data is accessed actively, the small portion being subproportional to the data's size. As previously described, the user may not originally ascertain the correct storage configuration (e.g., the appropriate storage units in the appropriate classes) to match the capabilities of the storage system with the intended application workload. Moreover, the user may not have the knowledge to apply configuration changes to existing storage units to accommodate changes in workload or physical configurations (e.g., additional devices). In light of this situation, it is appropriate for mechanisms conducted under the auspices of the user (i.e., policies) that automatically determine and place data segments in an appropriate storage tier. It is also true that higher performing storage tiers like SSD are expensive and hence their best use is to storage data that has high performance requirement. Hence the need to tier hot data to and cold data from high performance storage.

To address the various issues previously described, the illustrated embodiments below provide mechanisms for enhancing such automatic placement by incorporating reference count information readily obtainable from data deduplication systems into the deterministic functionality behind such automation. Inline data deduplication systems must maintain virtual storage mapping information in-memory for fast access to data. Otherwise, an additional map fault penalty would be incurred when fetching mapping information from physical storage, which would increase storage latency significantly. Accordingly, such storage mapping information is accurate, and available to be used for tiering placement considerations. This storage mapping information, collectively termed "reference count information" herein, may be used solely in such a determination, or as a weighted factor in a basket of considerations for migration of data between storage tiers as will be further illustrated.

One benefit of implementation of the mechanisms of the present invention serves to minimize any time lag associated with determining "hotness" of a particular data segment over time, since reference count information associated with the given data segment provides additional information about the segment's activity. Accordingly, a data segment having an increased reference count indicates that such data segment is in demand and should be appropriately placed in a higher performance storage tier (i.e., SSD having reduced latency). Alternatively, a data segment having a lower reference count indicates that such data segment is in lesser demand and should be appropriately placed in a lower performance storage tier (i.e., disk and/or tape) where elements of cost-effectiveness are maximized.

In embodiments where reference count information is used as a weighted factor in a determining consideration, the use of such reference count information again increases the certainty of making an appropriate placement decision at an earlier time. As a result, by implementation of various aspects of the present invention, a user may realize a multiple-tier storage system that improves, for example, return on investment through optimal and intelligent use of differing storage tier characteristics. This may be accomplished, in one embodiment, by use of fine grain data placement and non-disruptive data migration based on the reference count information, along with consideration of I/O activities in differing regions of the storage, and by taking advantage of characteristics of the various storage classes, such as use of SSD for higher input/output operations per second (IOPS) and lower latency characteristics, and use of devices such as HDD and tape for higher capacity storage, for example.

The illustrated embodiments dynamically increase confidence in the identification of new "hot spots" and "cold spots" in the storage system. Storage system performance is monitored to adapt a fine grain (i.e., small unit of data based) data placement mechanism to an appropriate storage device class, by monitoring reference count information associated with each individual data segment. Based on I/O statistics collected from such storage system monitoring, a fine grain, non-disruptive storage migration plan may be generated, and later, executed. Accordingly, pursuant to this functionality, a user need not configure a storage unit (such as a LUN) to the appropriate device class prior to executing an owning application. Moreover, the storage system is capable of dynamically adjusting the fine grain data placement according to a changing workload from one or more owning applications, or in response to a configuration change within the storage system.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing storage environment in which aspects of the invention may be implemented. A plurality of host systems 2a, b . . . n transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems 2a, b . . . n in lieu of presenting a number of physical or logical volumes (often which may be physically configured in a complex relationship). The host systems 2a, b . . . n may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache system 14 and non-volatile storage unit 16, such as a battery backed-up memory device. The storage controller 6 stores in cache 14 data updates received from the hosts 2a, b . . . n to write to the virtual storage volumes 22, 24, and 26 (and thereby to volumes 28, 30, and 32) as well as data read from the volumes 28, 30, and 32 to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Storage controller 6 also includes a data deduplication engine 17 in communication with a storage management module 18 as will be further described. Data deduplication engine 17 is configured for performing, in conjunction with processor 10, data deduplication operations on write data passed through storage controller 6 to virtual volumes 20 and volumes 28, 30, and 32.

Cache system 14 includes a data frequency index map 15, or "storage map" 15 for short. Cache system 14 accepts write data from hosts 2a, b . . . n or similar devices, that is then placed in cache memory. Data deduplication engine 17 then tests the write data for duplication in the cache memory and writes an index and frequency for such in the storage map 15.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems 2a, b . . . n, the underlying physical configuration may take many possible forms. For example, a number of interrelated storage devices in various classes, such as SSD, SATA, HDD, tape, etc. may comprise the storage volumes 28, 30, and 32 depending on a particular configuration.

Various components of the storage environment, such as processor 10, may be adapted to implement aspects of the present invention and following claimed subject matter. For example, a storage management module 18 may operate in conjunction with processor 10 to perform various functionality to be further described, such as monitoring I/O activity, transforming the I/O activity to an analyzable representation, creation of a data migration plan, and finally, execution of this plan. One of ordinary skill in the art will appreciate that other various data processing and memory components may be implemented to realize these aspects, and may be operational on the storage controller 6, or elsewhere. Storage management module 18 may further comprise a variety of additional modules as will be further described to implement various portions of functionality. For example, in one embodiment, the storage manager module 18 may further comprise modules for I/O monitoring, modules for collecting reference count information from storage map 15, a data placement module for data migration, and a data placement advisor module for communicating suggested data migration to a user. Such modules are not illustrated for purposes of convenience but would be understood to someone of ordinary skill in the art.

Figure 2:
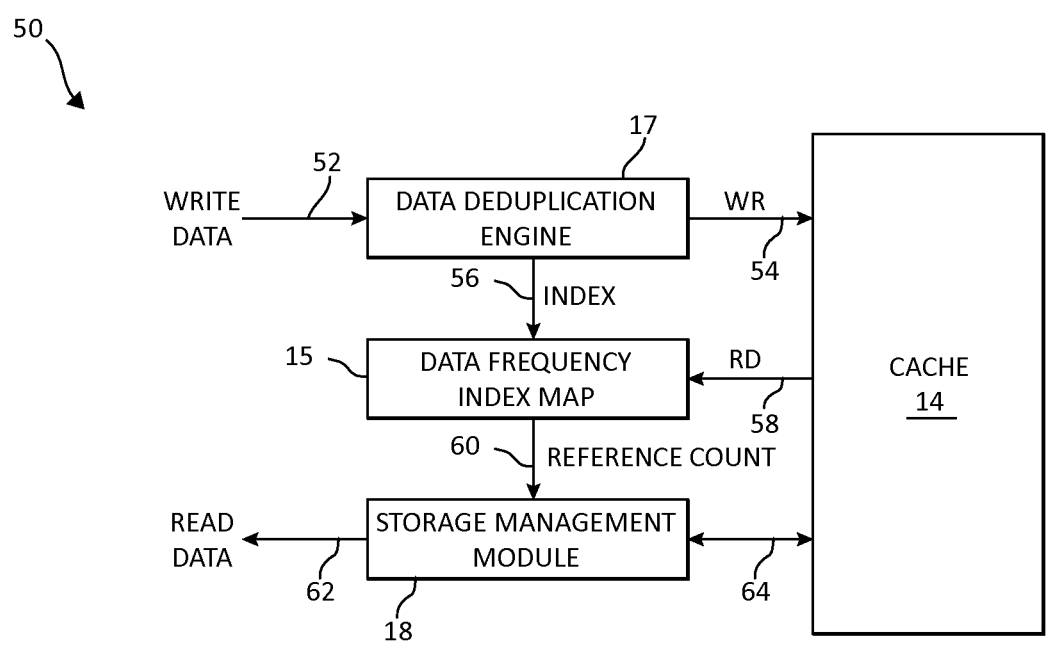
FIG. 2 is a block diagram of a cache system embodiment of the present invention illustrating a relationship between data deduplication system, storage map and storage management module for enhancing storage performance in tiered storage systems.

Turning now to FIG. 2, a block diagram of various functional aspects of the present invention are depicted as an exemplary flow. Specifically, cache system 14 is shown to accept write data 52 to be processed through data deduplication engine 17 as a write 52 to cache 14. As the write data 52 is processed through the data deduplication engine 17, and as previously described, the write data 52 is tested for duplication with existing storage, and the deduplication engine passes the frequency and index information 56 to the storage/data frequency index map 15. Storage systems that incorporate data deduplication functionality as shown in FIG. 2, include a reference count for each chunk of data, which indicates how many chunks of virtual storage map onto a single chunk of physical storage, among other indications.

As data is read 58 out of the cache 14, the storage map 15 is updated. The information contained in storage map 15 is provided including reference count information 60 to the storage management module 314, which is also in bi-directional communication 64 between the cache 14 and the storage controller 6 (FIG. 1), and thereby hosts 2a, b . . . n as read data 62. Based at least in part on such activity, the storage management module 18 may determine where to place a particular data segment (e.g., in which of volumes 28, 30, and 32 as shown in FIG. 1).

Figure 3:
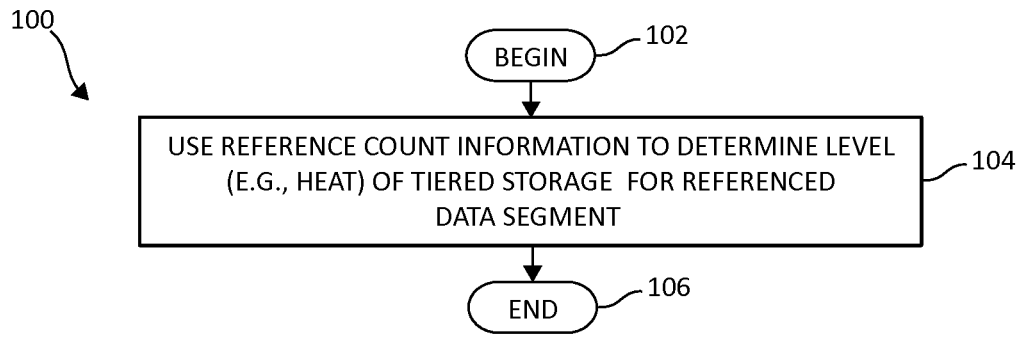
FIG. 3 is a flow chart diagram of an exemplary embodiment for enhancing storage performance using reference count information obtained from a data deduplication system.

Turning now to FIG. 3, a flow chart diagram of an exemplary method 100 for enhancing storage performance in a tiered storage environment is depicted. Method 100 begins (step 102) by utilizing reference count information as previously described to determine an appropriate level (e.g., heat) of tiered storage for a particular referenced data segment (step 104). Method 100 then ends (step 106). Again, the reference count information may be used solely or in combination with additional factors (e.g., I/O activity, operational window, latencies, cost/benefit analysis) to determine the appropriate tier at a particular time.

Figure 4:
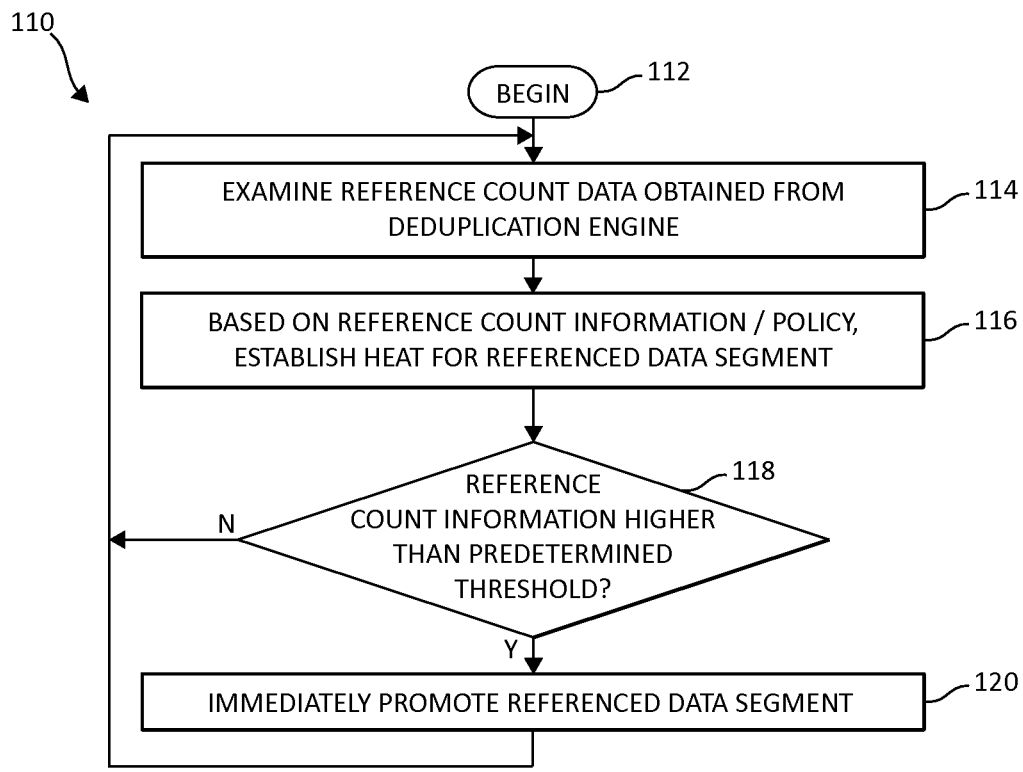
FIG. 4 is a flow chart diagram of an additional exemplary embodiment for enhancing storage performance using reference count information obtained from a data deduplication system.
Figure 5:
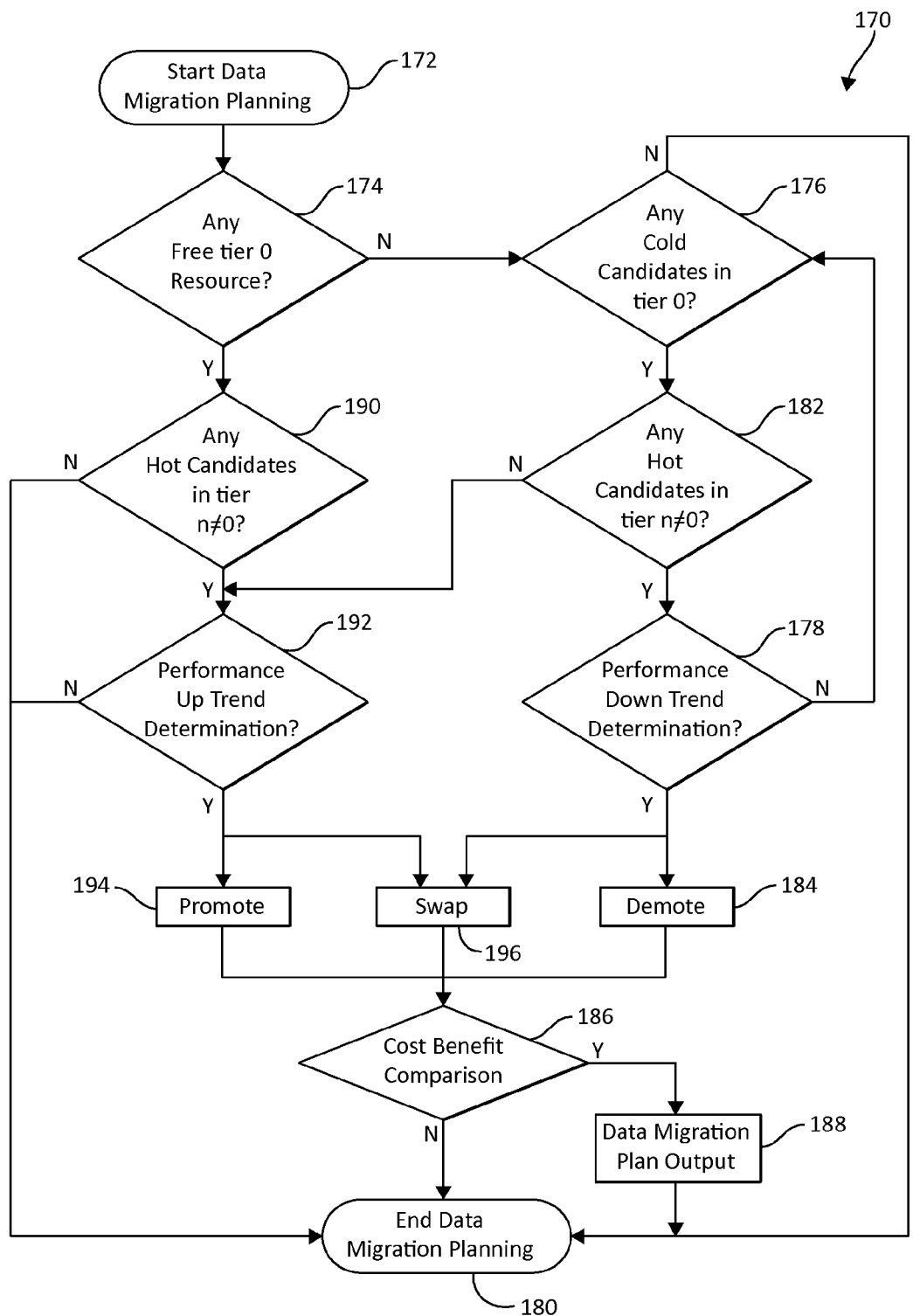
FIG. 5 is a flow chart diagram of an exemplary embodiment for data migration where reference count information obtained from a data deduplication system is used as a factor to determine performance uptrend.

FIG. 4, following, illustrates one exemplary implementation of using such reference count information to determine an appropriate tier of storage as described in FIG. 3, previously. Method 110 begins (step 112) by examining reference count data obtained from the deduplication engine (step 114). Based on the reference count information or/and an implemented policy, the appropriate level for the reference data segment is initially established (step 116). If, for example, the reference count information on first access to any data segment has a reference count value that is higher than a predetermined threshold (step 118), then the referenced data segment is immediately promoted to higher performance storage (step 120). The reasoning behind this functionality is that if the reference data segment is being accessed once, the data segment is current. At the same time, if the reference count for the referenced data segment is high, it indicates that the data segment is more likely to be accessed by multiple applications more frequently. Hence the data segment is a candidate for instant promotion to a higher storage tier. The method 110 then returns to step 114 to examine additional reference count information.

In view of FIG. 4, consider the following example. If a file "abc.doc" is being frequently downloaded from the Internet by a team of 10 people today, the file has an associated reference count of 10. All members of the team are accessing the same file actively today. However, after a three-month period, even though the reference count is high, the file may not be currently in use. If the file is again accessed, the mechanisms of the present invention will determine that the file has a high reference count, combined with the fact that the file is currently being accessed, making the file a candidate for instant migration to a higher performance tier. These mechanisms alleviate the monitoring time, for example, necessary for a later determination based on such factors as I/O activity once the file is again accessed that the file should be promoted to higher performance storage tiers.

As a further enhancement to the exemplary embodiment, if the currently accessed file is again no longer accessed, at some point a determination (based on policy/cost considerations, etc.) is appropriate that the file should be demoted to a lower tier. In these situations, the reference count information may not be used in such a determination, or the information may be discounted over time to the point that is abandoned as a consideration.

As previously described, the reference count information for a data segment may be combined with other factors, such as I/O performance statistics, to make data placement and/or migration decisions. Accordingly, in one embodiment, I/O performance statistics (in addition to use of the reference count information) of a logical, non-overlapping unit of storage may be collected and recorded for every I/O operation. Such logical non-overlapping unit of storage may be a logical block device, a subdivision within a logical block device, a file, a subdivision within a logical file, a database table space, or database objects. In every fixed duration, a set of performance data may be snapshot. This performance data may include such information as an I/O access pattern (e.g., read/write counters, I/O counters, etc.) and cumulative latency characteristics 52, as well as a cache miss count, total data transferred, and an average I/O size, for example. This I/O performance data gathering may take place in rough synchronization with the determination of placement per reference count information, and it may continue after an initial placement to determine if a further migration should be made.

Following the collection of the aforementioned performance data, the "raw" performance data may be digested and transformed to performance trend data kept in the form of moving averages (including predefined smoothing factors corresponding to each moving average), as will be further described. The digested form helps to reduce metadata storage and allows for significantly more historical data to be retained. In addition, the transformed data may be used to determine which of short-term or long-term performance demands of the storage system should be first addressed.

In one exemplary embodiment, the storage management module collects hundreds of data samples in one day, and collects thousands of data samples in one week. The collection of a certain number of samples per a predefined interval may vary according to a particular implementation, as one of ordinary skill in the art will appreciate. In this context, the hundreds of samples may be used to generate short term moving average data, and thousands of samples may be used to generate long term moving average data.

The moving averages may be used in sorting and ranking the performance of different logical units of storage. By doing so, data placement analysis will identify "hot spot" and "cold spot" candidates of different storage tiers, classes or pools. Hot spot candidates may be thought of as logical units of storage where an owning application demands a higher I/O performance capacity, while cold spot candidates are the opposite. These candidates may be sorted and are passed to the next phase to evaluate cost-benefit considerations of possible data placement and/or data migration. Again, the use of reference count information may occur previous to this ranking, contemporaneous with, or subsequent to as an additional factor of consideration.

FIG. 6, following, is a flow chart diagram of exemplary data migration planning 170 that may be implemented according to aspects of the present invention. Planning 170 illustrates incorporating reference count information into a data migration plan/policy that is later executed, for example. During such data migration planning 170, the storage management module may use the following decision logic to determine how to generate a migration plan to move data among and between a fastest tier (tier 0) and a number of slower tiers (tier n). To start such planning (step 172), the storage management module first determines if there is free available space in tier 0 (step 174). If so, the method 170 moves to step 190, where the method prepares for data promotion pursuant to the data migration plan. If no, the method 170 then moves to step 176, where the method begins to make further determinations as to whether to demote or swap data as will be further described.

Returning to step 190, the method 170 determines if there are any hot data candidates in a temperature-sorted moving average list in tier n. The head of the list represents the hottest data within the corresponding tier n. Pursuant to this determination, the hot candidates are tested to determine whether their performance trending is increasing (step 192). To make this determination, the method 170 compares the short term moving averages to the long term moving averages. Here, as previously described, the method 170 may incorporate the examination of reference count information into this determination. For example, an initially high (but not past a certain threshold), or increasing reference count over time may lend weight to a determination that performance trending is increasing. If the particular hot candidate is determined to be on an "up" trend, and the method 170 moves to either step 194 or step 196. Otherwise, the candidate is not determined to be on an up trend, and the method 170 exits the current considerations for the particular candidate and returns to step 190 to look for additional hot candidates having an up trend.

Returning to steps 194 and 196, the method 174 (depending on various determinations of the storage management module), begins to prepare to generate a promoting data migration plan for the hot candidate on tier n. For example, the storage management module may determine whether the migration cost of this particular hot candidate is justified by determining whether the projected performance gain of the hot data candidate resulting on the tier 0 will be larger than the cost migration. The projected performance can be determined by using the current performance profile and modeled if the same workload applied to the tier 0. Hence the projected performance gain is equal to current performance minus the project performance. The cost of migration can be calculated a priori in terms of I/O count and total latency.

If the projected performance gain is a net gain pursuant to the aforementioned cost/benefit comparison (step 186), the promoting data migration plan is generated for the selected hot candidate (step 188). If the data suggest pursuant to the cost benefit comparison in block 186 that such a net gain is not clearly satisfied, then the hot candidate may be a better candidate for swap functionality according to block 196, and again pursuant to these determinations, the swapping data migration plan output is generated for the selected candidate (again, step 188).

Returning to step 176, the method 170 determines if any cold data candidates are found in the temperature-sorted moving average list in tier 0. Here, in the illustrated embodiment, the reference count information may be omitted from consideration, or, as previously described, may be given less weight over the passage of time. In one embodiment, the tail of the list represents the coldest data within the corresponding tier 0. The cold data candidate will be tested as to whether the performance trending is down. To determine whether the performance trend is down for the selected cold candidate, the method 170 again compares the short term moving averages to the long moving averages (step 178). If the short term moving average is smaller or equal to the long term moving average, then the candidate is trending down, and the method 178 moves to step 184. Otherwise, the candidate is not on the down trend, and the method 170 exits analysis for the selected candidate and returns to step 176 to identify additional cold candidates with a down trend. If no additional cold candidates are found, the method 170 ends (step 180).

Returning to step 182, a determination is made whether any hot data candidates are found in the temperature-sorted moving average list in tier n. In one embodiment, the head of the list represents the hottest data within the corresponding tier n. This candidate will be tested as to whether performance trending is up (again, step 192). Here again, to determine whether the performance trending is increasing, the short term moving average is compared against the long term moving average. If the short term moving average is larger or equal to the long term moving average, the candidate is on an up trend, and the method moves to either step 194 and 196 as previously described. Alternatively, the candidate (again now for tier n) is not on an increasing trend, and the method 170 exists the current analysis and returns back to step 190 to look for additional lower-tiered data candidates.

If no additional hot candidates are found for the particular tier, then the method 170 moves from step 182 to step 192, where it prepares to generate a swapping data migration plan for the hot data candidate on tier n, and the cold data candidate on tier 0. Pursuant to this determination the method 170 again conducts cost/benefit comparisons in block 186 described previously, such as determinations as to whether the swap migration cost of the selected hot data candidate and cold data candidate is justified. This may be performed by calculating whether the projected performance gain of the hot data candidate resulting on the tier 0 minus the projected performance loss of cold data candidate result on the tier n will be larger than the cost of migration. The projected performance can be determined by using the current performance profile and modeled if the same workload applied to the tier 0 or tier n. Hence the projected performance gain is equal to current performance minus the project performance. To obtain comparable units, the performance gain is multiplied by a time, such as the expected time in tier 0. The cost of migration can be calculated a priori in terms of I/O count and total latency.

Following generation of various migration plans for selected hot/cold candidates, a number of exemplary steps may be taken to implement promoting, swapping, and/or demoting functionality as previously described. For example, pursuant to implementing a promoting data migration plan or policy, a free storage resource may first be allocated in the target tier. The source of the migration is then read to a data buffer. Next, the buffer is written to the free storage resource. Finally, the resource containing the source of data migration is deallocated.

Similar steps may be taken in implementing a swapping data migration. First, a free resource is allocated in a source hot tier. Next, the source of the cold candidate is read to a data buffer. The buffer is written to the free resource. A vacant resource of the cold candidate is reserved. The source of the hot candidate is read to the data buffer, the buffer is then written to the vacant resource, and finally, the resource originally containing the hot candidate is deallocated.

Here again, similar steps may be taken in a demoting data migration. A free resource is first allocated, and the source of migration is read to a data buffer. The buffer is written to the free resource, and the resource originally containing the source of migration is deallocated. As one of ordinary skill in the art will appreciate, each of the various steps described above may be varied according to a particular implementation. Furthermore, the steps may be repeated for each of the hot and cold candidates on varying tiers until none are remaining.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for improving data storage and retrieval performance in a computing environment by a processor, comprising:
    for a tiered storage environment having levels corresponding to storage performance, using reference count information of at least one data segment maintained in the tiered storage environment to determine which of the levels in the tiered storage environment the at least one data segment will be assigned;
    obtaining input/output performance data for input/output operations on the at least one data segment and transforming the input/output performance data into short term moving averages and long term moving averages;
    sorting the at least one data segment having higher reference counts such that the at least one data segment having the most activity is at a top of a list;
    comparing the short term moving averages of the at least one data segment in a performance level to the long term moving averages of the at least one data segment in the performance level and examining the reference count information of the at least one data segment in the performance level over time to determine whether a performance trend of the at least one data segment is increasing or decreasing; and
    promoting the at least one data segment to a higher performance level in the tiered storage environment, if the at least one data segment has an increasing performance trend and a determination that a migration cost of migrating the at least one data segment to the higher performance level is justified; wherein the migration cost is associated with an input/output count and a latency value.

2. The method of claim 1, wherein those of the at least one data segment having higher reference counts are assigned to a higher performance level than those having lower reference counts.

3. The method of claim 1, further including obtaining the reference count information from a data deduplication engine.

4. The method of claim 1, further including monitoring the tiered storage environment to associate the reference count information with the at least one data segment.

5. The method of claim 4, wherein upon a first access to the at least one data segment, and a determination that the at least one data segment has an associated reference count above a predetermined threshold, immediately migrating the at least one data segment to the higher performance level.

6. The method of claim 1, wherein using the reference count information includes using the reference count information as a weighted factor with additional characteristics of the at least one data segment to determine the which of the levels to assign the at least one data segment.

7. The method of claim 6, further including using an input/output activity, including at least one of a read count and a write count as the additional characteristics to determine the which of the levels to assign the at least one data segment.

8. The method of claim 7, further including subsequently using the input/output activity solely to determine if the at least one data segment should be migrated from a higher performance level to a lower performance level.

* * * * *